United States Patent [19]

Abplanalp

[11] Patent Number: 4,546,525
[45] Date of Patent: Oct. 15, 1985

[54] APPARATUS FOR THE MASS PRODUCTION OF A GASKET-BEARING AEROSOL MOUNTING CUP

[76] Inventor: Robert H. Abplanalp, 10 Hewitt Ave., Bronxville, N.Y. 10708

[21] Appl. No.: 565,703

[22] Filed: Dec. 27, 1983

Related U.S. Application Data

[60] Division of Ser. No. 332,510, Dec. 21, 1981, abandoned, which is a continuation of Ser. No. 112,791, Feb. 1, 1980, abandoned.

[51] Int. Cl.[4] .................. B21B 15/00; B21D 39/03; B23P 23/04; B23P 25/00
[52] U.S. Cl. .................... 29/33 K; 29/235; 29/789; 29/801; 220/66
[58] Field of Search ............... 29/450, 33 K, 789, 801; 220/66, 67

[56] References Cited

U.S. PATENT DOCUMENTS

| | | | |
|---|---|---|---|
| 1,322,843 | 11/1919 | Townsend | 29/235 X |
| 1,681,829 | 8/1928 | Wesseler | 29/235 X |
| 2,045,087 | 6/1936 | Keller et al. | 29/235 UX |
| 2,769,228 | 11/1956 | Burge et al. | 29/33 K X |
| 3,067,501 | 12/1962 | Baumann et al. | 29/235 |
| 3,387,355 | 6/1968 | Herring | 29/235 |
| 3,481,019 | 12/1969 | Whitney | 29/789 X |
| 3,553,815 | 1/1971 | McElvey | 29/789 |
| 3,807,021 | 4/1974 | Birkett | 29/789 X |
| 3,940,845 | 3/1976 | Czerwiak | 29/235 X |

Primary Examiner—Charlie T. Moon
Attorney, Agent, or Firm—Davis Hoxie Faithfull & Hapgood

[57] ABSTRACT

Apparatus and method for applying gasket material to the skirt of a gasket for the mounting cup of an aerosol container, wherein the gasket material is mechanically applied to the mounting cup through the use of a novel mandrel and cutting arrangement. A mounting cup, having a uniquely placed gasket, said gasket extending from the skirt into the channel of the mounting cup.

13 Claims, 19 Drawing Figures

APPARATUS FOR THE MASS PRODUCTION OF A GASKET-BEARING AEROSOL MOUNTING CUP

This is a division of application Ser. No. 332,510, filed Dec. 21, 1981, now abandoned, which is a continuation of Ser. No. 112,791, filed Feb. 1, 1980, now abandoned.

BACKGROUND OF THE INVENTION

Aerosol dispensing containers have found widespread use in the packaging of fluid materials including a variety of both liquid and powdered particulate products. Such containers are provided with a valve-controlled discharge orifice and operate by the action of a volatile propellant which is confined within the container together with the product to be dispensed. Because the propellant has an appreciable vapor pressure at room temperature, the product in the closed container is maintained under super-atmospheric pressure.

A typical aerosol unit comprises a hollow cylindrical container which is tightly closed at one end and is provided with an opening at its opposite end for receiving a dispensing valve assembly. A closure, commonly referred to as a mounting cup, serves as the closure for the container and as a support for the valve assembly. Typically, the mounting cup comprises a panel having an aperture for receiving the valve assembly a skirt depending from the periphery of the panel, and an annular channel extending outwardly from the edge of the skirt. When the mounting cup is placed in sealing position on the container, the channel is positioned over the bead surrounding the container opening and the lower portion of the skirt adjacent to the channel is flared outwardly against the container wall adjacent the bead. To ensure adequate sealing between the closure and the container, the cup is provided with a gasket which may reside in the annular channel or predominantly in the channel of the cup.

Heretofore, mounting cup gasket seals have been formed by disposing a previously cut gasket in the channel. This type of gasket has the disadvantage of not being stationary relative to the mounting cup during propellant filling or other valve unit assembly operations with the undesirable consequence that when the mounting cup and container are clinched to effect the seal, the gasket is often disposed at an angled position, and thus, the clinching operation is less effective.

Another commercial method for forming the gasket onto the mounting cup consists in forming the gaskets in situ from liquid gasket-forming compositions comprising an elastomer dispersed or dissolved in a volatile organic liquid vehicle. In the manufacture of such a gasket, the liquid composition is deposited in the desired configuration in the channel of the cup while the cup is rotated beneath a metering nozzle through which the composition flows. The deposit is then converted into a dry solid sealing mass by expelling the liquid vehicle at elevated termperatures. Though this technique of flowing gaskets into place has received wide commercial acceptance, it suffers from the disadvantages of requiring the elaborate drying operation, wherein the mounting cup must be handled carefully so as to avoid undue upset from the horizontal; costly recovery apparatus for the expelled organic liquid also must be provided. In sum, the flowed gasket is an expensive step in the formation of the mounting cup. See U.S. Pat. No. 3,342,381 as an example of the "flowed" gasket.

Other techniques for disposing a gasket onto the mounting cup are described in U.S. Pat. No. 3,417,177 wherein the gasket seal is made of heat shrinkable material. After placing a band of gasket material on the skirt, the gasket having a greater diameter than the outside diameter of the skirt of the mounting cup, the cup is heated at a termperature and for a time sufficient to shrink the band into tight frictional engagement with the skirt.

Another similar technique is that disclosed in U.S. Pat. No. 3,443,006, wherein a band of gasket material is swelled through the use of a suitable swelling agent so as to increase its diameter to fit over the skirt of the mounting cup. Subsequently, the swelling agent is removed from the gasket material so that the band will come into tight frictional engagement with the skirt.

Both the heat shrink and swelling techniques for applying a gasket material to the mounting cup have the disadvantage of being costly and relatively time consuming procedures. Note in U.S. Pat. No. 3,417,177, Col. 4, lines 27-31 that the positioned bands must be heated to 240° F. for about 2-3 minutes in order to obtain a tight friction fit. In the procedure of 3,443,006, the bands must stand in the swelling liquid for a period of ½ to 1½ minutes according to example 2 of the '006 patent and then allowed to stand for the drying period. Also in any mass production utilizing the '006 system, an organic liquid recovery system must be employed.

SUMMARY OF THE INVENTION

In contrast to the foregoing techniques for applying a gasket seal to the mounting cup, the present invention provides a novel method and apparatus for the mass production of gasketed-mounting cups and a novel gasketed-mounting cup, wherein the gasket material is disposed on the mounting cup in the preferred position for effecting a seal between the mounting cup and the bead of the container; and further wherein the disadvantages associated with the aforementioned techniques of applying the gasket material to the cup are obviated.

Also, an apparatus and method is provided wherein gaskets are applied to aerosol mounting cups in an exceptionally rapid and efficient manner to form gasketed-mounting cups having excellent sealing characteristics.

In general, the method of this invention comprises passing a tubular sleeve of gasket material onto a compressible mandrel; initially positioning and aligning the skirt of the mounting cup and the contiguous end of the mandrel such that the sleeve of gasket material may pass onto the skirt, said mandrel having fixed and moveable portions with respect to each other and to their movement toward and away from the mounting cup; urging the moveable portion of the gasket material bearing mandrel toward the mounting cup such that the gasket material passes onto the skirt of the cup; causing the moveable portion of the mandrel to retract to its initial position, cutting the sleeve at a point between the mounting cup and the mandrel to leave a band of gasket material; and subsequently, advancing the mounting cup to a station whereat the band of the gasket material is urged further onto the skirt of the mounting cup, whereby, the band of gasket material does not extend beyond the skirt. At this stage, the gasketed-mounting cup may be further processed.

The present invention will be more clearly understood by referring to the drawings herein and the discussion relating thereto.

In the drawings:

FIG. 2 A-F is a schematic of one embodiment of the invention showing the several steps utilized in positioning the gasket material onto an aerosol mounting cup.

Figure 1:
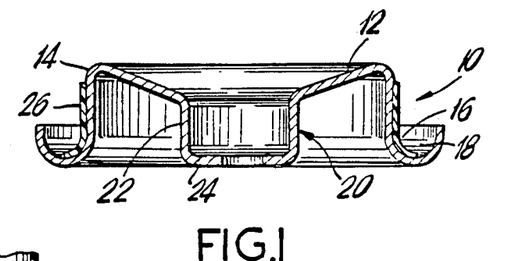
FIG. 1 shows in section view a gasketed aerosol mounting cup prepared according to the method and apparatus of this invention.
Figure 2A:
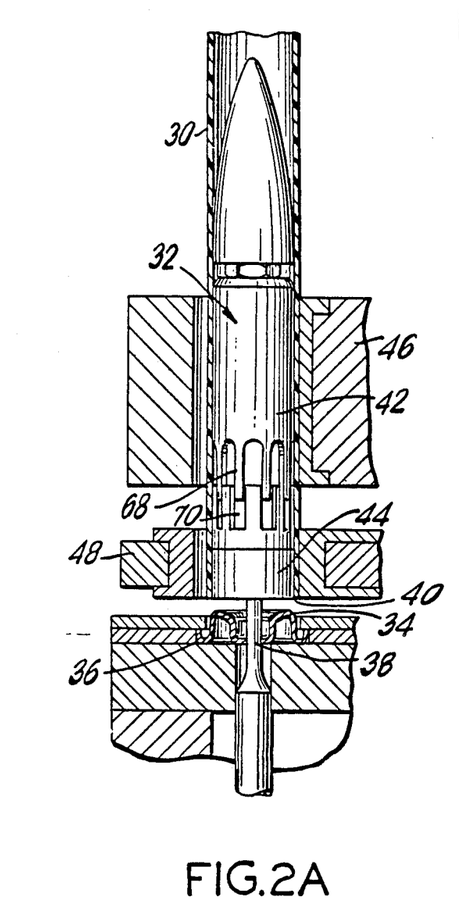
Figure 2B:
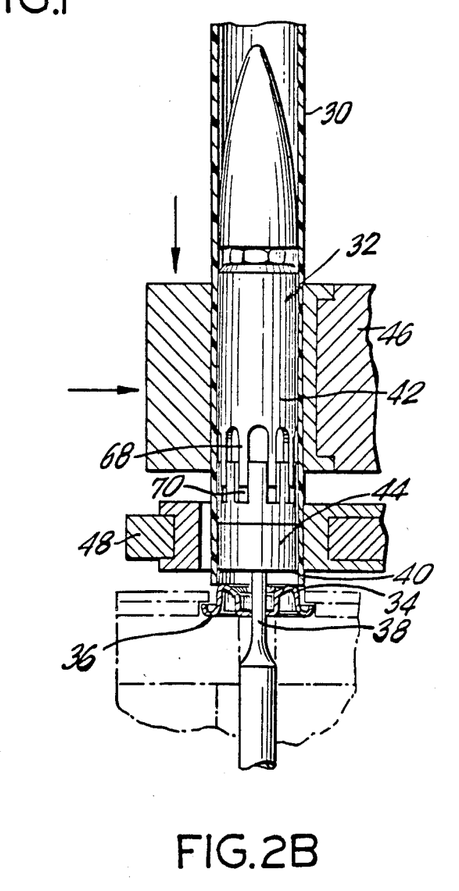
Figure 2C:
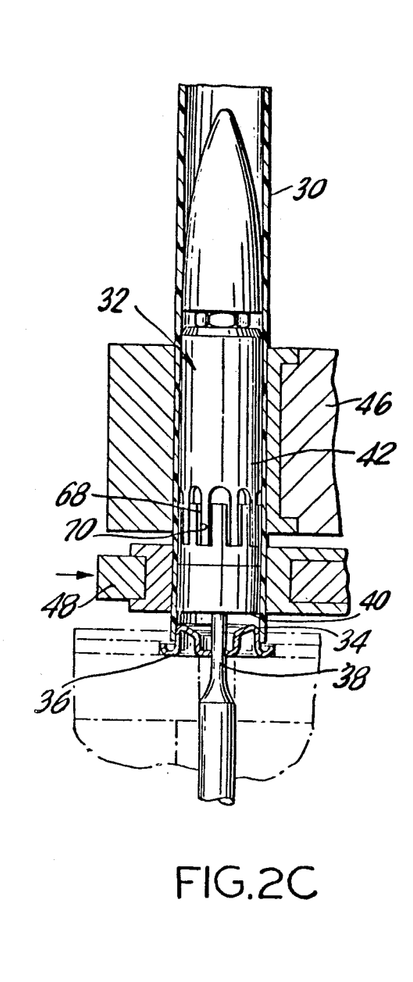
Figure 2D:
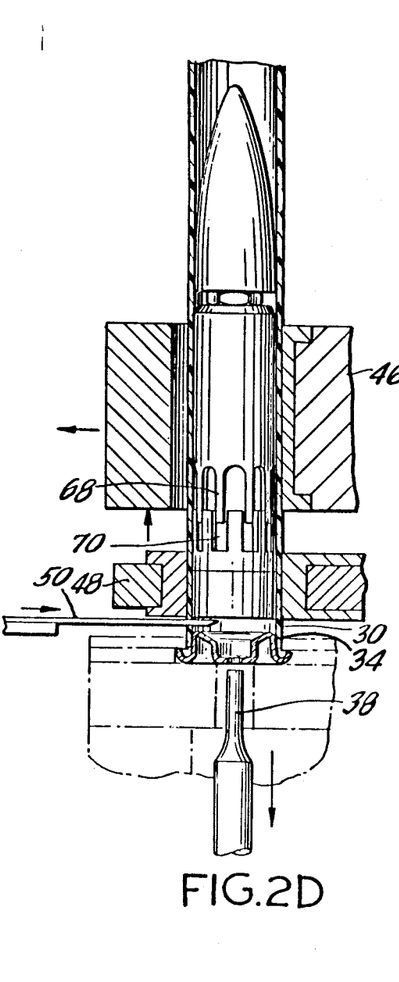
Figure 2E:
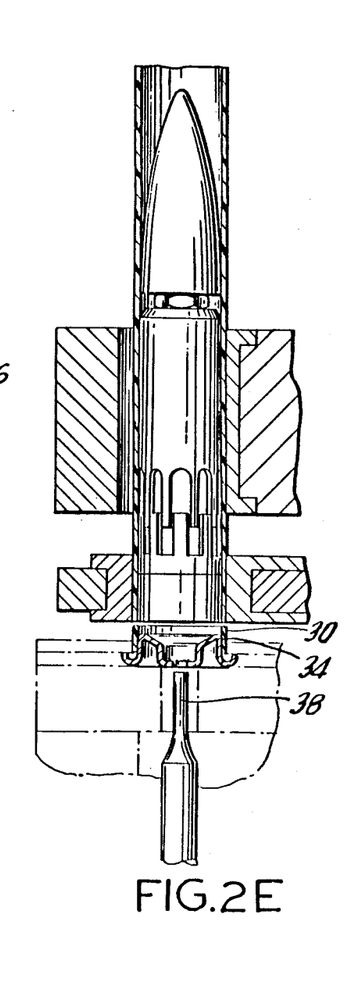
Figure 2F:
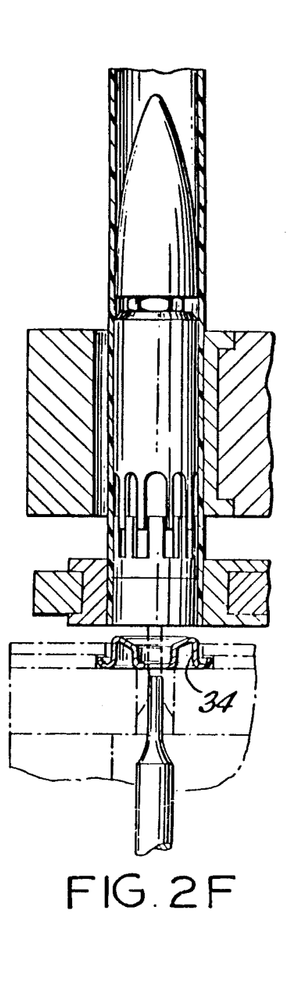

FIG. 1 is a sectional view of a gasketed-mounting cup shown in inverted position relative to its placement in the assembled container and produced according to the general method heretofore described. The mounting cup, generally designated as 10, comprises a circular panel 12 having an integral skirt 14 depending from its periphery. The free edge of skirt 14 is outwardly flanged at 16 to form an annular channel 18 for embracing the bead surrounding the container opening (not shown) then the cup is positioned thereon. The inner portion of panel 12 is countersunk to form a tubular rim, generally designated as 20, which has a dependent circular wall 22 integrally joined with an apertured horizontal wall 24. When the cup is placed in sealing position, the rim 20 acts as a pedestal for the valve unit and the valve stem is admitted into the container through apertured wall 24. The gasket 26 is disposed on the exterior surface of the skirt 14 and extends beyond the juncture of the skirt and channel and a distance into said channel.

In FIGS. 2 A-F, corresponding parts in each figure are as numbered and described in FIG. 2 A, said figures showing a schematic of the relative positioning of the moving components of the apparatus at each stage of the cycle in advancing a plastic gasket material onto a mounting cup and cutting the tube to ultimately provide a band of gasket material disposed on the skirt of the mounting cup.

In FIG. 2 A, a sleeve of gasket material 30 is disposed over the length of the mandrel, generally designated as 32. Mounting cup 34 is securely positioned within a seat 36, which is mounted on a suitable base, in a manner known to those skilled in the art. Positioning pin 38 extends through the central aperture in the pedestal of the mounting cup 34 and provides a fixed spacing between the bottom surface 40 of the mandrel 32 and the mounting cup 34. Mandrel 32 has an upper portion 42 and a lower portion 44 which are retractably collapsible relative to each other (the structure of which is more fully described in FIG. 4). An upper and lower gripping member is provided at 46 and 48, respectively.

FIG. 2 A, the initial stage of a single cycle, shows the mandrel 32 disposed atop the positioning pin 38, with the mandrel 32 having the gasket material disposed at the initial cycle stage, i.e., terminating at the bottom surface 40 of the mandrel 32. Both gripping members, 46 and 48, are in an open position.

In FIG. 2 B, the upper gripping member 42 closes about the mandrel 32 and subsequently moves the upper portion 42 of the mandrel 32, toward the mounting cup 34. By this motion, the gasket material 30 is moved past the stationary bottom suface 40 of the lower protion 44 of the mandrel 32.

In FIG. 2 C, the gasket material is first disposed on the skirt of the mounting cup 34 the desired distance, and subsequently, the lower gripping member 48 engages the lower portion 44 of the mandrel 32.

At the next stage of the cycle, FIG. 2 D, the upper gripping member 46 releases allowing the upper portion 42 of the mandrel 32 to return to its original position. Concomitantly, the positioning pin 38 is lowered beneath the mounting cup 34 and thereafter a cutting edge 50 (shown only in FIG. 2 C) is passed through the gasket material 30.

FIG. 2 E, shows a mounting cup with a band of the gasket material 30 on the skirt of the mounting cup.

At the next stage, FIG. 2 F, the bottom gripper 48 is closed on the bottom portion 44 of the mandrel 32 and positioning pin 38 is moved to the position shown in FIG. 2 A, after which the gripper 48 is released and the system is at the initial stage shown in FIG. 2 A.

Figure 3:
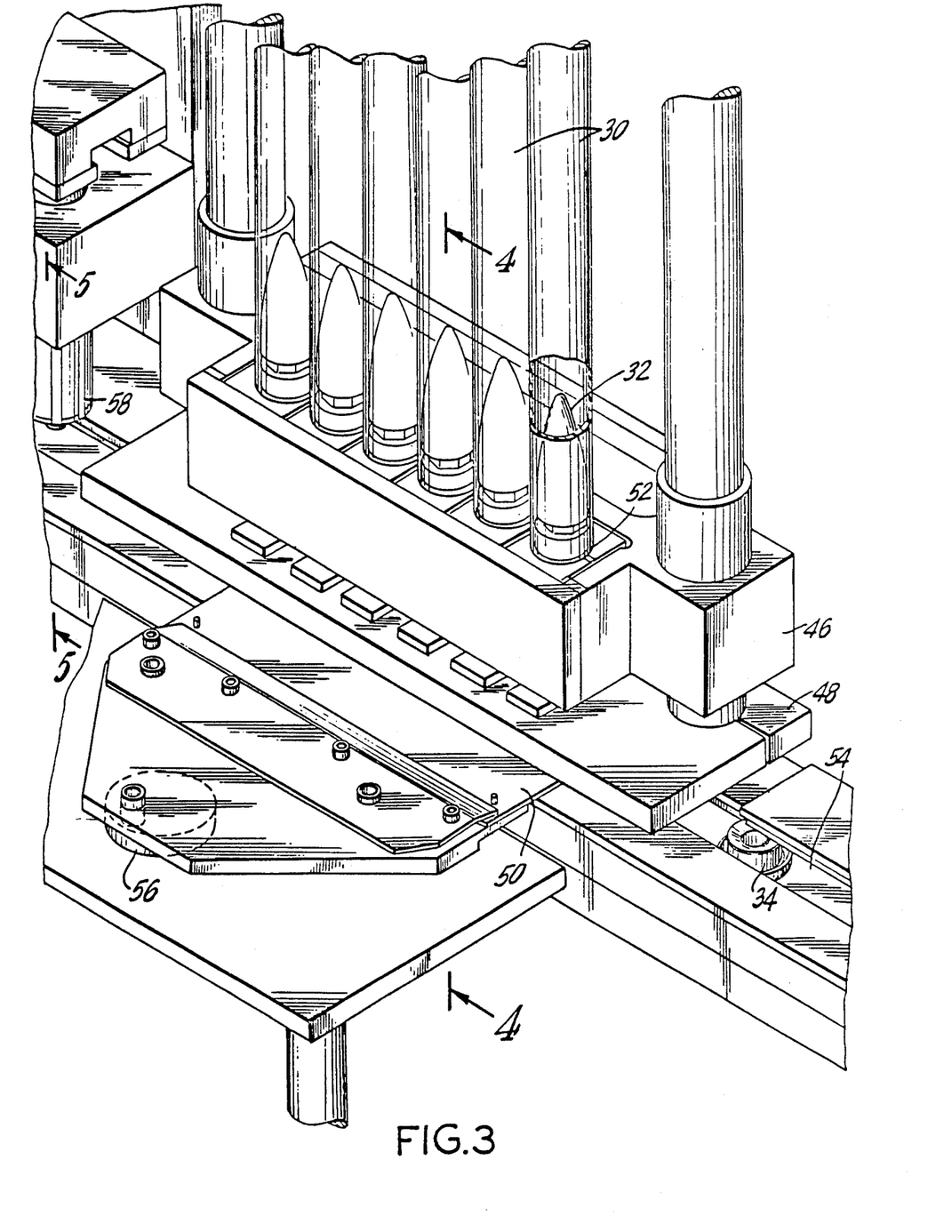
FIG. 3 is a perspective view of the apparatus of the embodiment of FIG. 2 together with the apparatus used in a second operation on the product of the embodiment of FIG. 2.

FIG. 3 shows a six-station gasket-mounting cup assembly. The gasket material 30 is fed from individual rolls (not shown) of said material. Upper gripping member 46 has a series of openings 52 which receive the mandrel 32. The bottom gripping member is 48. Mounting cup 34 is fed through a raceway 54 to a position beneath each of the mandrels 32. Not shown for reason that it is known to those skilled in the art, is the structure which transports, here six, a given number of mounting cups along the raceway 52 to their respective positions in vertical alignment with each associated mandrel. In the timing chart of FIG. 6, these structures are referred to as the feed finger, feed arm and locator device. Cutting edge 50 is mounted onto a rotating wheel 56 in such a manner as to impart an elliptical motion as the cutting edge advances and retreats during the cutting cycle. After the mounting cup has received the gasket material 30, the cup is moved to a station whereat a hollowed bottom plunger 58, shown in more detail in FIG. 5, advances over the skirt of the mounting cup and urges the gasket material 30 along the skirt.

Figures 4, 5, 14:
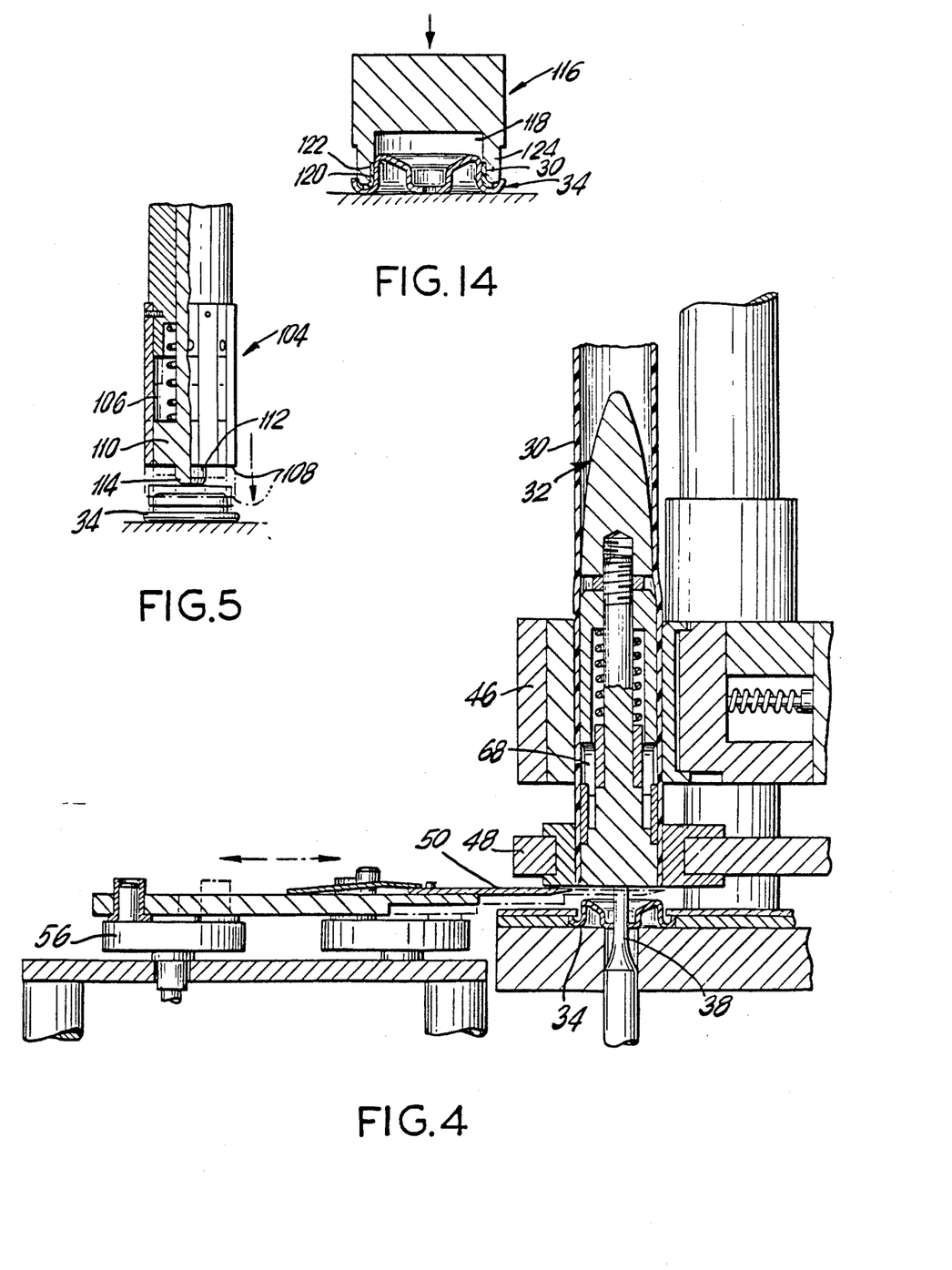
FIG. 4 is a sectional view of the apparatus of the embodiment of FIG. 2, along the line 4—4 of FIG. 3.
FIG. 5 is a partial section of the apparatus used in the second operation on the product of the embodiment of FIG. 2, along the line 5—5 of FIG. 3.
FIG. 14 is a partial sectional view of a second embodiment of the apparatus used in the second operation on the products resulting from the operation of FIG. 2 A-F or FIG. 7.

FIG. 4 shows in more detail the structure of a single mandrel-mounting cup station of the embodiment shown in FIG. 3. The upper portion 42 of the mandrel 32 has a tapered upper surface 60 which is threaded onto the upper portion 42, the shape of the portion 60 facilitating the passing of the gasket material onto the mandrel 32. Further, the upper portion 42 of the mandrel 32 has a cavity 62 in which is disposed a spring 64. Shown best in FIGS. 2 A-F are the plurality of fingers 66 which form the bottom end of the upper portion 42 of the mandrel 32, and the plurality of recess 68 in lower portion 44 of the mandrel 32, and which are aligned to receive the fingers 66 when the upper portion of the mandrel 32 is moved toward the lower portion of the mandrel.

The upper gripping member 46 is a conventional chuck which is connected to a reciprocating ram such that it may rapidly advance and retreat from the mounting cup and when gripping the upper portion of the mandrel move said portion toward the mounting cup.

The lower gripping member 44 is a conventional chuck.

The cutting edge 50 is mounted in a conventional manner and proscribes an elliptical path in its advance and retreat from the mounting cup 34.

FIG. 5 shows a reciprocating plunger, the lower outer shoulder of which engages the upper edge of the gasket material and urges it further onto the skirt of the mounting cup. In FIG. 5, the plunger, generally designated as 104, has a lower hollow portion 106, terminating in shoulder 108. Set within the lower portion 106 is spring-loaded centering pin 110 having the protuberance 112. The protuberance 112 has the beveled terminating portion 114 which mates with and centers the mounting cup 34 by contacting the sloped panel 12 of the mounting cup.

Figure 6:
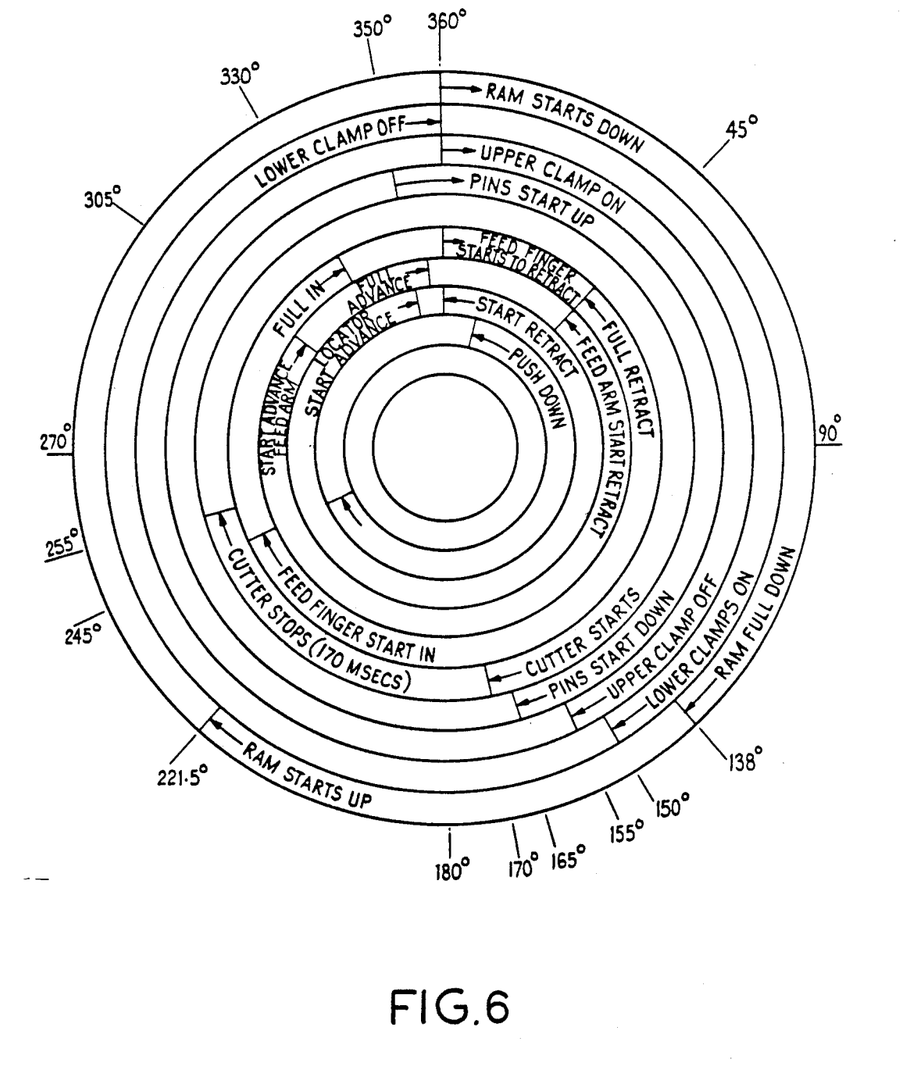
FIG. 6 is a timing diagram through a single cycle for producing the mounting cup according to the embodiment of FIG. 2.

FIG. 6 describes a timing cycle that is suitable for the six-station unit shown in FIG. 3. In FIG. 6, the clamp is the gripping member, pins the positioning pins, feed finger and feed arm are a conventional mechanism for advancing six mounting cups per cycle to be positioned to receive the gasket material.

Figure 7:
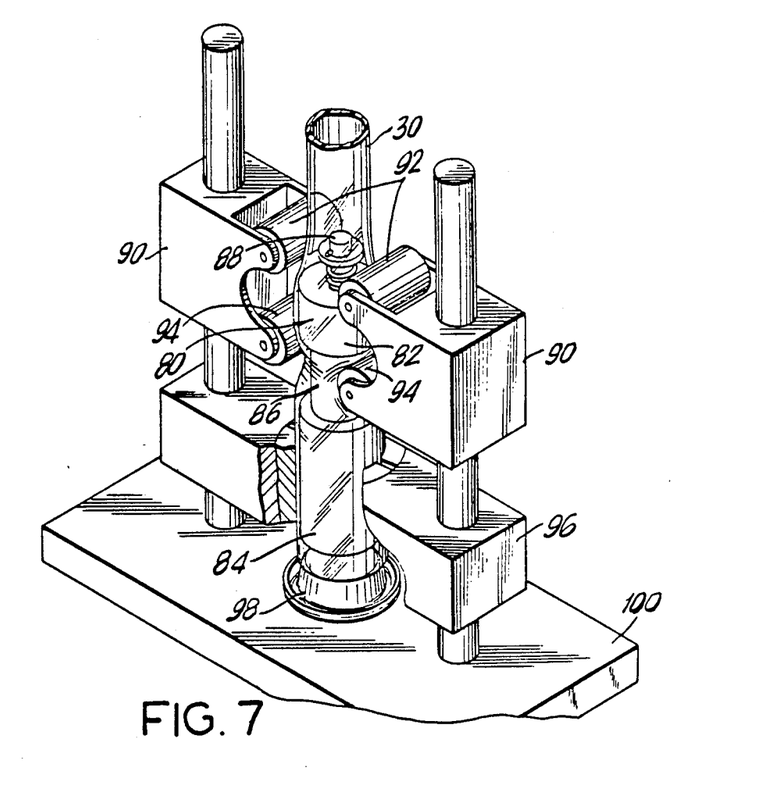
FIG. 7 is a perspective view of a second embodiment of the invention.
Figure 8:
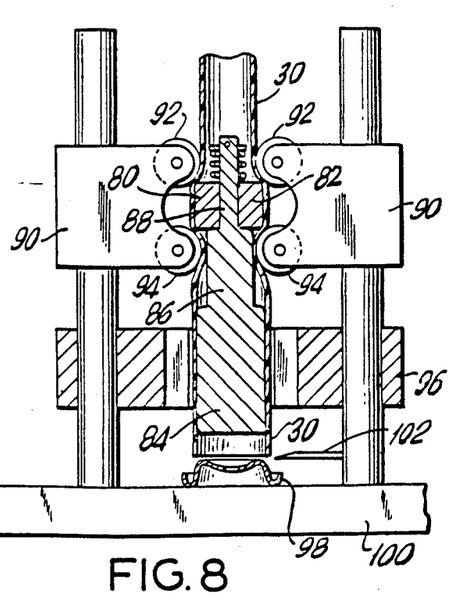
FIGS. 8 and 9 are views of the apparatus of the embodiment of FIG. 7, showing the positioning of the apparatus in an initial and advanced position, respectively, relative to the mounting cup.
Figure 9:
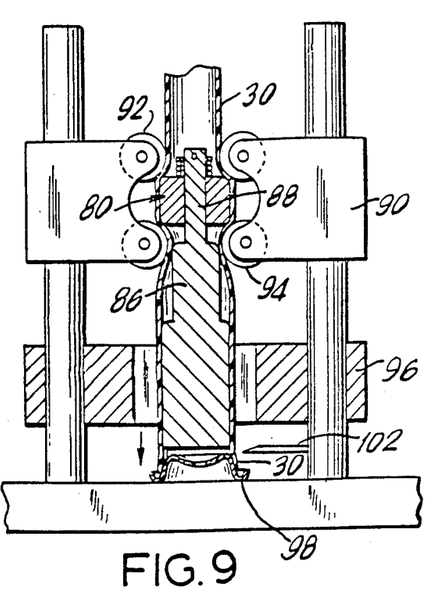

A second embodiment of the mandrel-gripper arrangement is shown in FIGS. 7-9. This embodiment offers the improvement of simplified construction avoiding the need for a positioning pin passing through the central opening in the mounting cup. In the perspective view of FIG. 7, the gasket material 30 is passed over a mandrel, generally designated as 80. The mandrel 80 has an upper portion 82 and a lower portion 84, the latter having recessed portion 86 and upper extension 88 which passes through upper portion 82, said upper extension 88 being resiliently mounted against the upper surface of portion 80. Upper gripping member has upper and lower sets of rollers 92 and 94, respectively, said rollers being adjusted against upper mandrel portion 82 so as to preclude movement of mandrel portion 80. The lower gripping member 96 is of conventional chuck design and has means, not shown, for reciprocally advancing the lower gripping member toward the mounting cup. The mounting cup 98 is affixed in a suitable holding device on the base 100.

FIG. 8 shows the mandrel-gripper arrangement of the embodiment of FIG. 7 in initial position for starting the gasket material onto the mounting cup. The gasket material 30 extends beyond the mandrel portion 84, a short distance, ¼" has been found satisfactory. FIG. 9 shows the lower gripper 96 closed onto the mandrel portion 84. Moving the lower gripper 96 toward the mounting cup 98, advances the gasket material 30 onto the skirt of the mounting cup. The nature of the gasket material is such that as the mandrel portion 84 is advanced toward the mounting cup, the gasket material 30 passes through the rollers 92 and 94 of the upper gripping member 90. After the gasket material has been placed onto the skirt of the mounting cup, the lower gripping member 96, is released and the mandrel portion 84 returns to the initial position shown in FIG. 8; the cycle is then ready to be repeated. After the return of the mandrel portion 84, the cutting edge 102 advances to sever the gasket material. After cutting, the mounting cup is passed to a station (see FIG. 5), whereat the gasket material 30 is advanced further onto the skirt of the mounting cup. The single mandrel of FIGS. 7-9 may, as with the embodiment of FIGS. 2-5, comprise a multiple mandrel-gripping member arrangement.

To form a friction fit between gasket material and the skirt of the mounting cup, the inside diameter of the sleeve of the gasket material is slightly less than the outside diameter of the skirt portion of the mounting cup. Conventionally, the so-called 1 inch aerosol mounting cups have a skirt diameter of 0.980–0.990". It has been found that gasket material having a thickness of 0.017 is satisfactory. To accomodate this thickness of gasket, mounting cups having a skirt diameter of 0.950 inches have been used.

While any plastic gasket material having sufficient resiliency may be used, provided however, that there is compatability between the container contents and the plastic material, it has been found that a plastic comprising low density polyethylene (density range of 0.916–0.922) having 5–15% polyisobutylene in the molecular weight range of 40,000–200,000, plus stabilizers usually used with polyethylene in the environment in which the gasket material will reside, provides a satisfactory gasket material over a broad product range.

The apparatus and process of this invention provides a means for the mass production of a novel gasketed-mounting cup. The novel gasketed-mounting cup comprises a sleeve of gasket material which extends along a substantial portion of the skirt of the mounting cup and onto at least a portion of the channel of said cup. Advancing the sleeve of gasket material into the channel of the mounting cup, may require relieving stresses in the plastic material which will cause the plastic sleeve to retreat from the channel and creep back onto the skirt of the mounting cup. It has been found that heating prior or during the advance of the plastic sleeve onto the skirt will relieve stresses. Heating, for example, by induction heating, the mounting cup to 130°–140 ° F. has been found satisfactory. It has also been found that the aforesaid stresses may be relieved through a combination of heating and applied force on the gasket material in the channel of the mounting cup.

FIG. 14 shows a novel plunger structure for applying force to the gasket material residing in the channel of the mounting cup.

In FIG. 14, the reciprocating plunger is generally designated as 116. The lower hollow portion 118 of the plunger 116 has a recess portion 120 on the inner wall of the plunger 116 providing shoulder 122 and portion 124 extending from the recess portion 120. In operation, the plunger 116 moves toward the mounting cup 34 such that the shoulder 122 engages the gasket material 30 and urges it onto the skirt of the mounting cup 34 until the portion 124 bottoms against the channel of the mounting cup 34. During the bottoming, a compressive force is transmitted to the gasket material within the channel of the mounting cup 34.

FIGS. 10–13 further illustrate and describe the novel mounting cup in its sealing relation with an aerosol container.

Figure 10:
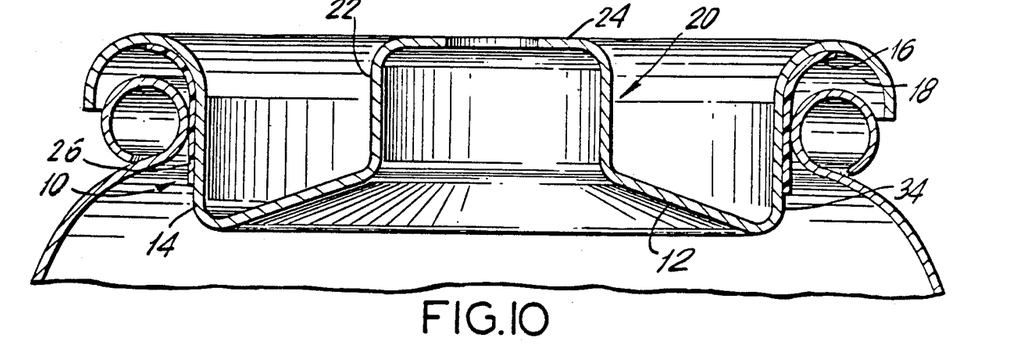
FIGS. 10–13 are sectional views of the novel mounting cup of this invention and an associated container in unseated, seated and clinched relationships, respectively.

FIG. 10 shows the gasket mounting cup being positioned onto the bead of an aerosol container.

Figure 11:
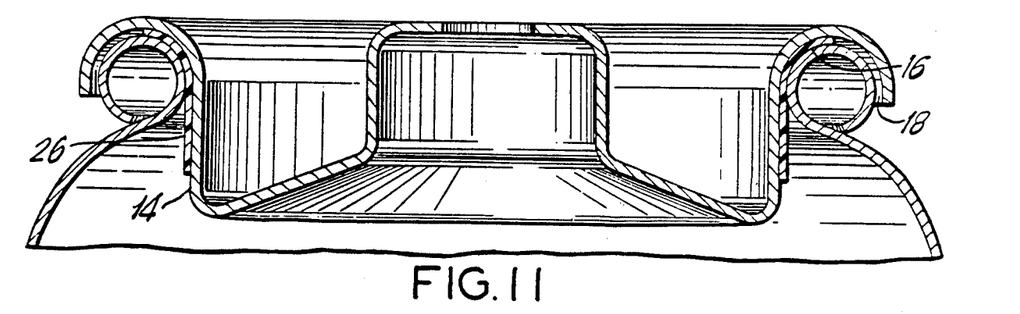
Figure 12:
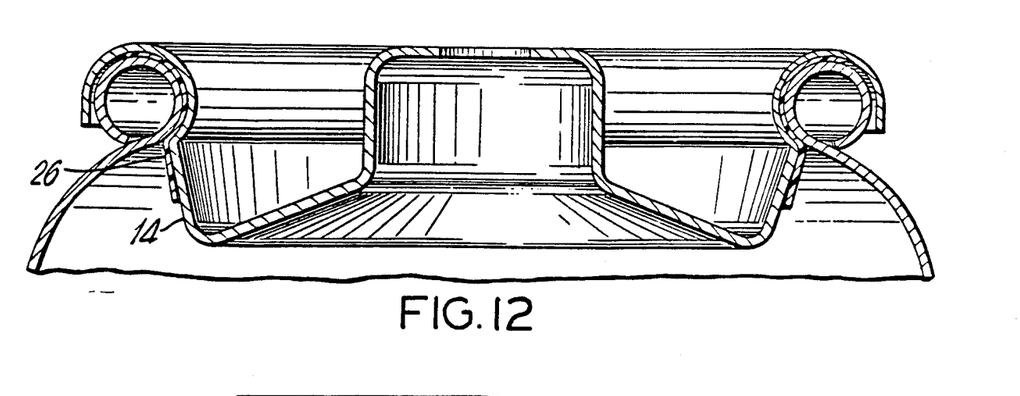
Figure 13:
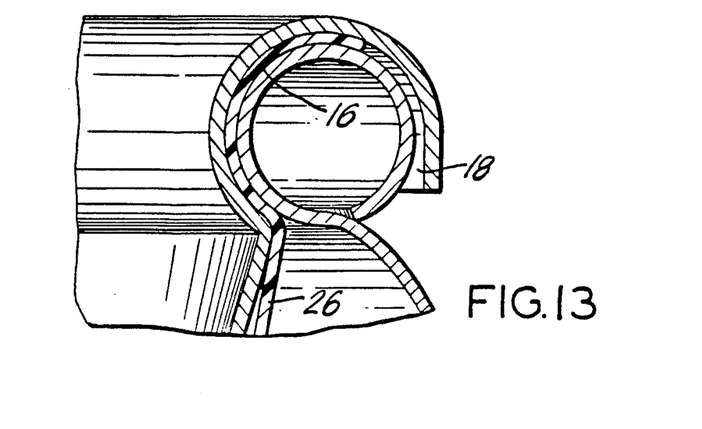

FIG. 11 shows the mounting cup and container bead in position just prior to clinching the mounting cup by outwardly extending the vertical skirt portion of the mounting cup.

In contrast to mounting cups having gasket material only along the skirt portion of the cup, the cup of this invention, by having gasket material from the point of clinch between the cup and the container bead as well as extending the gasket material onto the channel, provides a mounting cup having superior sealing characteristics. Also, the gasket of the subject mounting cup is substantially uniform in thickness throughout prior to clinching to the container, whereas the "flowed-in" type gasket of the prior art is non-uniform, thinning toward the outer edge of the channel and where the skirt and channel intersect. Uniform thickness provides a better seal.

I claim:

1. An apparatus for the mass production of a gasket-bearing aerosol mounting cup having a panel, a skirt depending from the periphery of the panel and an annular channel extending outwardly from the skirt comprising:
   (a) means for positioning the ungasketed mounting cup to a predetermined station,
   (b) a mandrel member having a portion fixed in position with respect to the mounting cup and a portion reciprocally moveable with respect to the mounting cup and the fixed portion of the mandrel,
   (c) means for advancing a continuous sleeve of gasket material onto the mandrel member,
   (d) means for aligning the sleeve-bearing mandrel member and the skirt of the mounting cup and positioning the mandrel member the desired distance from said skirt,
   (e) means for urging the moveable portion of the mandrel toward the mounting cup, thereby advancing the sleeve of gasket material onto the skirt of the mounting cup,
   (f) means for returning the moveable portion of the mandrel to its initial position,
   (g) means for cutting the sleeve of gasket material beyond the skirt of the mounting cup to form a band of gasket material on the skirt of the mounting cup,
   (h) means for advancing the gasket band onto the skirt, such that the band of gasket material does not extend beyond said skirt.

2. The apparatus of claim 1, wherein the means for advancing the sleeve of gasket material (step e) includes:
   a gripping member for each of the mandrel parts, which gripping members grip and ungrip the respective parts of the mandrel independently of each other.

3. The apparatus of claim 2, and further wherein one of the gripping means is attached to a member which is capable of reciprocating so as to effect movement of the mandrel.

4. The apparatus of claim 3, and further wherein the means for returning the mandrel to its initial position comprises a member biasing each part away from the other.

5. The appartatus of claim 4, wherein the means disposed within the mandrel is a spring which biases the mandrel parts in an opposite direction to each other.

6. The apparatus of claim 5, wherein the mandrel has a tapered end for receiving the gasket material.

7. The apparatus of claim 5, wherein contiguous portions of the mandrel have a plurality of fingers and recesses which are mated so as to enable the fixed and moveable portions to compress in telescope-like manner toward each other.

8. The apparatus of claim 3, wherein the reciprocating member is attached to the part of the mandrel distal from the mounting cup.

9. The apparatus of claim 4, wherein the reciprocating member is attached to the part of the mandrel distal from the mounting cup.

10. The apparatus of claim 5, wherein the reciprocating member is attached to the part of the mandrel distal from the mounting cup.

11. The apparatus of claim 7, wherein the reciprocating member is attached to the part of the mandrel distal from the mounting cup.

12. The apparatus of claim 5, wherein the moveable portion of the mandrel is proximate to the mounting cup and extends through and terminates beyond the fixed portion; the fixed portion having a reduced diameter relative to the diameter of the moveable portion, and further wherein the means for returning the mandrel to its initial position is disposed between proximate surfaces of the extended moveable portion and the fixed portion.

13. The apparatus of claim 12, wherein the reciprocating member is attached to the portion of the mandrel proximate to the mounting cup.

* * * * *